UNITED STATES PATENT OFFICE 2,383,874 p-AMINOBENZENESULPHONAMIDES AND A PROCESS FOR THEIR MANUFACTURE

Henry Martin, Rudolf Hirt, and Otto Neracher, Basel, Switzerland, assignors to the Swiss firm of J. R. Geigy A. G., Basel, Switzerland No Drawing. Application March 13, 1942, Serial No. 434,626. In Switzerland April 24, 1941

4 Claims. (Cl. 260—397.7)

It has been found that valuable p-amino-benzenesulphonacylamides of the general formula

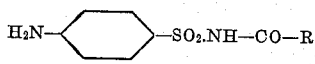

wherein R means a benzene radical substituted by at least one alkyl and/or alkoxy or alkylthio radical, which benzene radical may also contain further substituents, are obtained, if sulphonamides of the benzene series, which contain a nitrogen containing group in p-position to the sulphonamide group, are caused to react with alkyl- and/or alkoxy- or alkylthio-substituted carboxylic acids of the benzene series or functional derivatives thereof and if eventually the p-positioned nitrogen group is converted into an amino group. In the case where two alkyl, alkoxy or alkylthio substituents are present, the same can also be linked together by ring-formation. Compounds of this kind have not hitherto been disclosed; they differ from other p-aminobenzenesulphonacylamides by their improved activity against infection promoters and by a low toxicity.

As sulphonamides of the benzene series containing a nitrogen-containing group in p-position to the sulphonamide group there may be cited: p-aminobenzenesulphonamide, p-acylaminobenzenesulphonamide, p-nitrobenzenesulphonamide and the like. Instead of the nitro group any other group convertible by reduction into the amino group may be used, such as for example the nitroso, azo, azoxy or hydrazo group. Azomethine and acylamino groups may be converted into amino groups by hydrolysis. Advantageously such acyl radicals are selected which can again easily be split off. As such radicals the following may be for example enumerated: the acetyl or carbomethoxy radical which are again easily split off by a hydrolytic treatment without changing the acylated sulphonamide group.

The sulphonamides of the benzene series substituted in p-position by a nitrogen containing group can be used as such or also in form of their salts such as for instance p-nitrobenzenesulphonamide of sodium or p-acetylaminobenzenesulphonamide of potassium. The reaction with the acylation agents may also be carried out in the usual manner in the presence of bases such as pyridine, dimethylaniline and the like. As alkyl- and/or alkoxy-substituted carboxylic acids of the benzene series there may be cited: o-, m- or p-toluic acid, 2:4-dimethylbenzoic acid, 3:4-dimethylbenzoic acid, 2:5-dimethylbenzoic acid, 4-chloro-5-methylbenzoic acid, 5-chloro-4-methylbenzoic acid, 4-methoxybenzoic acid, 4-ethoxybenzoic acid, 3:4-dimethoxybenzoic acid, 4-methoxy-5-methylbenzoic acid, 5-nitro-4-methylbenzoic acid, trimethyl ether gallic acid, 3-acetylamino-4-methylbenzoic acid, piperonylic acid, benzodioxane carboxylic acid, 4-methylmercaptobenzoic acid, 3-methylmercaptobenzoic acid, 4-ethylmercaptobenzoic acid, 4-isopropylmercaptobenzoic acid, 3-methyl-4-methylmercaptobenzoic acid, 3-methylmercapto-4-methylbenzoic acid and the like. The acids may be used as such for example in the presence of catalysts, or in the form of their functional derivatives, whereby it is also possible to add acid-binding agents or agents having a condensing effect.

A special embodiment of the present process leading to the same products is constituted by the reaction of benzenesulphonhalides containing in p-position a nitrogen containing group, with amides of alkyl- and/or alkoxy- or alkylthio-substituted carboxylic acids of the benzene series. Eventually the p-positioned nitrogen group is to be also converted into an amino group.

The present invention is illustrated by the following examples, without being limited thereto. The parts are by weight, unless otherwise stated.

Example 1

202 parts of p-nitrobenzenesulphonamide are mixed with 170 parts of 4-methoxybenzoic acid chloride in 500 parts by volume of chlorobenzene, then 100 parts of copper powder are added thereto and the whole is boiled, while stirring, until the development of hydrochloric acid is completed. After about 3 hours the solvent is removed by steam, the residue sucked off, taken up in a sodium carbonate solution having a temperature of 60° C. and, after the addition of some animal charcoal, hot filtered. From the filtrate the final product is precipitated out by means of hydrochloric acid. When crystallised from alcohol of 80% strength this product melts at 156° C.

If no copper powder is added to the said mixture, the reaction takes place in a considerably slower way.

100 parts of the nitro compound thus obtained are reduced according to Béchamp with 200 parts of iron powder and 20 parts by volume of glacial acetic acid in 1000 parts of water. The reaction mixture is made alkaline with sodium carbonate, clarified and from the filtrate the amino compound is precipitated out by means of acetic acid. After recrystallisation from alcohol of 80% strength while adding animal charcoal, this product melts at 160° C.

Example 2

In 100 parts by volume of chlorobenzene or of another inert solvent, 20 parts of p-nitrobenzenesulphonamide and 16 parts of 3-methyl-4-methoxybenzoic acid chloride are dissolved, then 2 parts of copper powder are added thereto and the whole is boiled under reflux for 3 hours. After having expelled the chlorobenzene with steam, the residue, which has been sucked off, is dissolved in 1000 parts of water with the required quantity of sodium carbonate and the solution is filtered clear. The nitro compound is precipitated out from the filtrate by means of hydrochloric acid. After isolation, the raw product possesses the melting point of 179° C.

50 parts of this nitro compound are suspended in 500 parts by volume of water and 20 parts by volume of glacial acetic acid with the double quantity of iron filings and reduced according to Béchamp. After completion of the reduction, the whole is made alkaline by means of sodium carbonate, then the iron-mud is removed by filtration and the amino compound precipitated out from the filtrate by means of acetic acid. When recrystallised from alcohol of 80% strength under addition of animal charcoal, this product melts at 187° C.

Example 3

20.2 parts of p-nitrobenzenesulphonamide are suspended in 75 parts of nitrobenzene and brought to solution by adding by portions 13.3 parts of anhydrous aluminium chloride. On allowing 15.4 parts of 4-methylbenzoyl chloride to drop therein, hydrochloric acid is at once developed. The mass is then heated up to 80°–100° C., until the development of hydrochloric acid has terminated, whereupon the solution is poured on ice and the nitrobenzene removed by steam-distillation. The remaining 4-nitrobenzene-N-(4-methylbenzoyl)-sulphamide is recrystallised from alcohol or cyclohexanone. Melting point 244° C.

By catalytic hydrogenation there is obtained 4-aminobenzene-N-(4-methylbenzoyl)-sulphamide in form of colorless needles of melting point 144° C.

Example 4

45 parts of p-nitrobenzenesulphamide are caused to react, as indicated in Example 3, in 200 parts by volume of nitrobenzene in the presence of 28 parts of aluminium chloride with 30 parts of 2-methylbenzoyl chloride. Upon isolation of the product, there is obtained the nitro compound which is difficultly soluble in bicarbonate and shows a melting point of 186° C.

By catalytic reduction the corresponding amino compound is obtained which, when recrystallised from alcohol and water, melts at 176° C.

When instead of the 2-methylbenzoic acid compound in the above example, there is used the same quantity of 3-methylbenzoylchloride, there is obtained as intermediate product the m-benzoyl compound of melting point 126°–127° C. which is more easily soluble in bicarbonate and which by catalytic reduction is easily converted into the corresponding amino compound. When crystallised from alcohol, this compound melts at 160° C.

Example 5

37 parts of p-nitrobenzenesulphamide and 24 parts of aluminium chloride are caused to react in a nitrobenzene solution with 31 parts of 2:4-dimethylbenzoyl chloride. Upon isolation thereof, the nitro compound is obtained in form of yellow prisms of melting point 170° C. (when crystallised from alcohol).

By reduction the said nitro compound is converted into colorless, short needles which, when crystallised from alcohol, melt at 222° C.

Example 6

50 parts of p-nitrobenzene-sulphonamide of sodium are suspended in 200 parts of nitrobenzene and treated with 20 parts of 4-methylmercaptobenzoic acid chloride. First stirring is effected for 3 hours at room temperature and then the whole is kept for several hours at 90° C. The mixture is stirred with water having a temperature of 50° C., then made alkaline to litmus and clarified. From this solution the condensation product is precipitated out with diluted hydrochloric acid and directly reduced by means of iron. The reduction mixture is made alkaline with sodium carbonate, then freed from the iron mud, and from the filtrate the final product is precipitated out with acetic acid. When recrystallised from alcohol it shows a melting point of 182° C.

The 4-methylmercaptobenzoic acid is obtained according to Annalen der Chemie 436, 217, the acid chloride by reaction with phosphorus pentachloride; B. P. $_{0.5\,mm}$ 130° C., M. P. 65° C.

Instead of 4-methylmercaptobenzoic acid the 3- or 2-methylmercaptobenzoic acid may also be used. The 4-aminobenzenesulphone-3'-methylmercaptobenzamide melts at 185° C., while 4-aminobenzenesulphone-2'-methylmercaptobenzamide melts at 177° C.

Example 7

17 parts of p-nitrobenzenesulphonamide are dissolved in 50 parts of dry pyridine at 80° C. and, while thoroughly stirring, 17 parts of 3-methyl-4-methylmercaptobenzoic acid chloride are added thereto. After 1 hour the reaction is completed. After dilution with diluted hydrochloric acid the separated product is filtered by suction and recrystallised from alcohol. It constitutes a yellowish powder of melting point 185°–187° C.

The nitro body is reduced according to Béchamp by means of iron and acid, then the reaction mixture is made alkaline and clarified. From the filtrate the reaction product is precipitated out by means of diluted acetic acid, filtered off by suction and recrystallised from alcohol under addition of animal charcoal. Melting point 192° C.

The 3-methyl-4-methylmercaptobenzoic acid and its chloride may be prepared as follows:

22 parts of 3-methyl-4-aminobenzoic acid (Annalen der Chemie 144, 168) are hot dissolved in a mixture of 200 parts of water and 30 parts of concentrated hydrochloric acid, then the solution is cooled down to 5°–10° C. and diazotised. While thoroughly stirring, the diazonium solution is caused to flow into a hot solution of 70° C. of 25 parts of potassium xanthogenate and 20 parts of sodium carbonate in 100 parts of water. After ¼ hour cooling is effected down to 30° C., the solution treated with 6.5 parts of solid sodium hydroxide and, as soon as the same is dissolved, 20 parts of dimethyl sulphate are dropped into this solution. After 1 hour the whole is boiled for a short time under reflux, then distilled with steam and finally the residue is acidified by means of hydrochloric acid. The separated methylthiocarboxylic acid is drawn off, dried and distilled in high-vacuo. Boiling point$_{0.7\,mm.}$ 180°–190° C.; melting point 166°–167° C.

17 parts of 3-methyl-4-methylmercaptobenzoic acid are heated to boiling for 2 hours under reflux with 30 parts by volume of thionyl chloride, the excess thionyl chloride is removed and distillation carried out. Boiling point$_{0.8\,mm.}$ 135°–140° C.; melting point 64°–65° C.

Instead of 3-methyl-4-methylmercaptobenzoic acid the isomeric 3-methylmercapto-4-methylbenzoic acid may also be used. The melting point of the 4-aminobenzene-sulphone-3'-methylmercapto-4'-methylbenzamide is 217°–218° C.

Example 8

28.5 parts of p-nitrobenzenesulphonamide are dissolved at 70°–80° C., while stirring, in 100 parts of absolute pyridine and at this temperature 30 parts of 4-isopropylmercaptobenzoic acid chloride are slowly added thereto (preparation of the acid according to Am. Chem. Soc. 62, page 200 (1940), The nitro compound is reduced according to Béchamp as above indicated, the reaction mixture made alkaline and drawn off. From the filtrate the 3:4-dimethylbenzoyl-p-aminobenzenesulphoneamide is precipitated out by means of acetic acid and recrystallised from alcohol. It yields colorless crystals of melting point 222°–223° C.

Instead of the benzenesulphonamide substituted in p-position by a nitro group, which is used in the above examples, there may quite well be used the other p-substitution products enumerated in the general part. The p-acetyl- and carboalkoxy aminobenzene sulphonamides are especially suitable. For their use the final products may be converted into the metal salts.

By reason of the indications given in the Examples 1 to 9 p-nitrobenzenesulphonamide or one of its salts respectively may be acylated with the following carboxylic acid halides; thus there are obtained nitro- or amino compounds respectively of the following properties:

| No. | Carboxylic acid halide | Nitro compound | Amino compound, colorless crystals |
| --- | --- | --- | --- |
| 1 | p-Ethylbenzoylbromide | M. P. 160°–162° C. | M. P. 162°–163° C. crystallised from alcohol. |
| 2 | p-n-Propylbenzoylchloride | | M. P. 162° C. crystallised from alcohol of 30% strength. |
| 3 | p-Isopropylbenzoyl chloride | | M. P. 200° C. crystallised from alcohol. |
| 4 | p-n-Butylbenzoylchloride | | M. P. 157° C. crystallised from diluted alcohol. |
| 5 | p-Tert. butylbenzoyl chloride | M. P. 212° C. crystallised from diluted alcohol. | M. P. 232° C. crystallised from diluted alcohol. |
| 6 | 3-methyl-4-ethylbenzoyl chloride | M. P. 170°–171° C. crystallised from diluted alcohol. | M. P. 196° C. crystallised from diluted alcohol. |
| 7 | Indanecarboxylic acid chloride | M. P. 180°–181° C. crystallised from diluted alcohol. | M. P. 210°–211° C. crystallised from alcohol under addition of charcoal. |
| 8 | Tetraline carboxylic acid chloride | M. P. 183°–185° C. crystallised from diluted alcohol. | M. P. 220° C. crystallised from diluted alcohol. |
| 9 | 3:4-dimethoxybenzoyl chloride | M. P. 153°–155° C. | M. P. 232° C. crystallised from alcohol under addition of charcoal. |
| 10 | 2-methoxy-4-methylbenzoyl chloride | M. P. 180°–185° C. (raw) | M. P. 202° C. crystallised from alcohol. |
| 11 | 3-methoxy-4-methylbenzoyl chloride | M. P. 133°–134° C. from crystallised alcohol. | M. P. 202° C. crystallised from diluted alcohol. |
| 12 | 3-propyl-4-methoxybenzoyl chloride | | M. P. 213° C. recrystallised from alcohol. |
| 13 | 3-allyl-4-methoxybenzoyl chloride | M. P. 135° C. from diluted alcohol | M. P. 202°–203° C. recrystallised from alcohol. |
| 14 | 3-methyl-4-ethoxybenzoyl chloride | M. P. 114°–115° C. (raw) | M. P. 152° C. from diluted alcohol under addition of animal charcoal. |
| 15 | 3-methyl-4-isopropylhydroxybenzoylchloride. | | M. P. 142° C. from diluted alcohol. |
| 16 | Piperonylic acid chloride | | M. P. 197°–198° C. from diluted alcohol. |
| 17 | Benzodioxanecarboxylic acid chloride | | M. P. 213°–214° C. from alcohol under addition of charcoal. | acid B. P.$_{0.7\,mm.}$ 180° C.; M. P. 147°–149° C.; by means of thionyl chloride there is obtained the 4-isopropylmercaptobenzoic acid chloride, B. P.$_{1.1\,mm.}$ 135°–140° C.) The mixture is kept for half an hour at 95° C. and then worked up, as indicated in Example 7. Melting point of the nitro body 175° C.

The nitro body is reduced according to Béchamp; when recrystallised from alcohol, the 4-aminobenzenesulphone-4'-isopropylmercaptobenzamide melts at 215° C.

According to the same process the 4-aminobenzenesulphone-3'-isopropylmercaptobenzamide, M. P. 144° C., or the 4-aminobenzenesulphone-2'-isopropylmercaptobenzamide, M. P. 144° C., can be obtained.

Example 9

20.2 parts of p-nitrobenzenesulphonamide are dissolved in 50 parts by volume of dry pyridine and treated with 16.1 parts of 3:4-dimethylbenzoyl chloride. Then the whole is heated up to 90°–95° C. and, after completion of the reaction, diluted hydrochloric acid is introduced therein while stirring. The product thus separated out is filtered by suction and recrystallised from alcohol. Melting point 186°–187° C.

In the following the preparation of all of the new compounds used in the above table is described.

The p-n-butylbenzoyl chloride (see No. 4) is obtained from p-n-butylacetophenone (made from n-butylbenzene, a cetyl chloride and AlCl$_3$ in CS$_2$) by oxidation with chlorine lye at 60°–90° C. The acid (M. P. 95°–98° C.; B. P.$_{0.4\,mm.}$ 150°–155° C.) yields with thionyl-chloride the acid chloride, B. P.$_{13\,mm.}$ 145°–150° C.

The 3-methyl-4-ethylbenzoyl chloride (see No. 6) is prepared as follows: m-toluidine is heated up to 280° C. in the autoclave with absolute alcohol and zinc chloride (Journal of the Chemical Society, London, 1934, page 421), whereby 3-methyl-4-ethylaniline is obtained. From this product the corresponding nitril (B. P.$_{15\,mm.}$ 125° C.) is obtained according to Sandmeyer, and from the nitril one obtains the 3-methyl-4-ethylbenzoic acid, M. P. 135°–136° C., by saponification with sulphuric acid of 50% strength during 12 hours. From the latter acid there is obtained the chloride, M. P.$_{13\,mm.}$ 135° C., by heating with thionyl chloride on the water bath.

The indane carboxylic acid chloride (see No. 7) is obtained from the carboxylic acid by means of thionyl chloride. Boiling point₁₂ mm. 140°–145° C.

The tetraline carboxylic acid chloride (see No. 8) is prepared from acetyltetraline (Journal of Chemical Society, London 1938, page 1290) by oxidation with chlorine lye; from the carboxylic acid which has a melting point of 145° C. there is obtained the acid chloride, B. P.₁₂ mm. 160° C., by means of thionyl chloride.

β-Acetyltetraline (made from tetraline, acetylchloride and AlCl₃ according to Journal of the Chemical Society, London, 1938, page 1290) is oxidised with chlorine lye on the water-bath. M. P. 143°–145° C. From the acid one obtains the acid chloride, B. P.₁₂ mm. 160° C. (see No. 8), when heating on the water-bath with thionyl chloride in excess.

The 3-propyl-4-methoxybenzoic acid (see No. 12) may for instance easily be obtained from 3-allyl-4-methoxybenzoic acid (No. 13) by catalytic reduction.

The 3-allyl-4-methoxybenzoic acid chloride (see No. 13) is obtained from 3-allyl-4-hydroxybenzoic acid ester by methylation with dimethyl sulphate, saponification and interaction with thionyl chloride. Boiling point₁₂ mm. 157°–160° C.

3-methyl-4-isopropylhydroxybenzoyl chloride (see No. 15) is obtained by heating the disodium salt of the 4-hydroxy-3-methylbenzoic acid with isopropylbromide in an alcoholic solution in the autoclave for 10 hours at 140°–150° C., saponifying this compound in order to obtain the free acid (M. P. 145° C.) and causing the latter to react with thionylchloride in excess. Melting point₀.₆ mm. 132° C.

The benzodioxane carboxylic acid chloride (see No. 17) is obtained from acetylbenzodioxane (benzodioxane + acetyl chloride in CS₂), B. P.₀.₅ mm. 155° C., M. P. 88° C., by oxidation to the carboxylic acid by means of chlorine lye, M. P. 138°–139° C., and interaction of the acid with thionyl chloride. Boiling point₁.₀ mm. 155° C. melting point 105° C.

What we claim is:
1. The p-aminobenzenesulphonamides of the formula

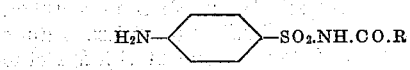

wherein R represents a benzene radical containing in p-position to the —NH.CO— group a member selected from the group consisting of CH₃, OCH₃ and SCH₃, and in m-position to the said group a member selected from the group consisting of H, CH₃, OCH₃ and SCH₃.

2. The p-aminobenzenesulphonamide of the following formula

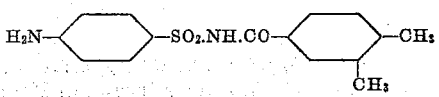

being colorless crystals of the melting point 222° C., when crystallized from alcohol possessing a very high chemotherapeutic activity.

3. The p-aminobenzenesulphonamide of the following formula

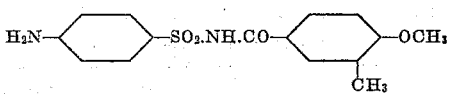

being colorless crystals of the melting point 187° C. possessing a very high chemotherapeutic activity when crystallised from alcohol.

4. The p-aminobenzenesulphonamide of the following formula

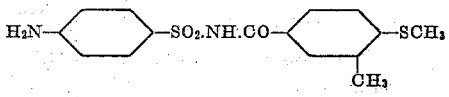

being colorless crystals of the melting point 192° C. possessing a very high chemotherapeutic activity when crystallised from alcohol.

HENRY MARTIN.
RUDOLPH HIRT.
OTTO NERACHER.